April 9, 1935.　　　　P. E. LIRIO　　　　1,997,492
INSECTICIDE DISPENSING APPLIANCE
Filed April 14, 1934
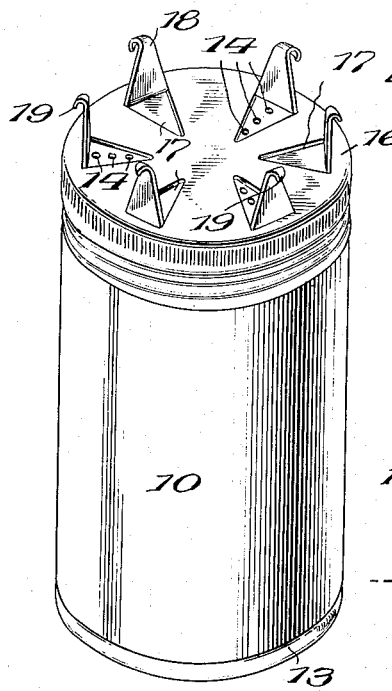
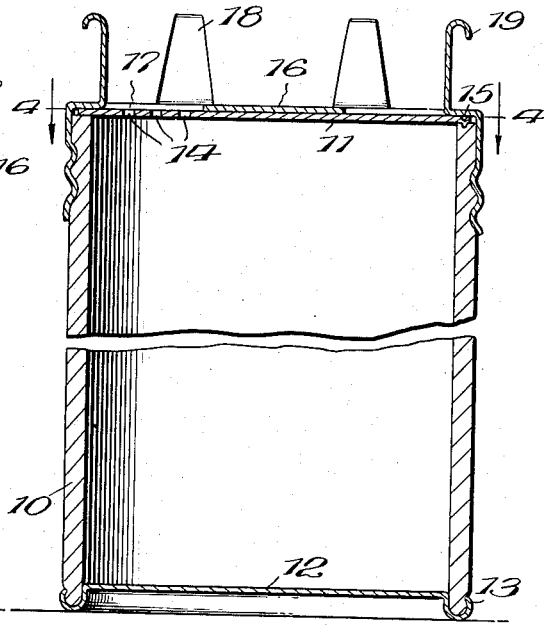
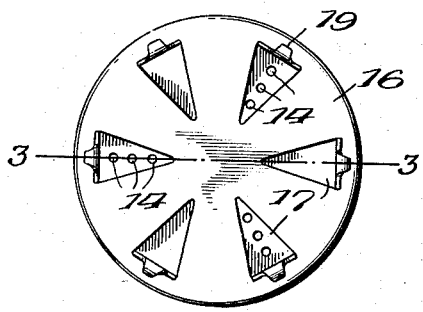
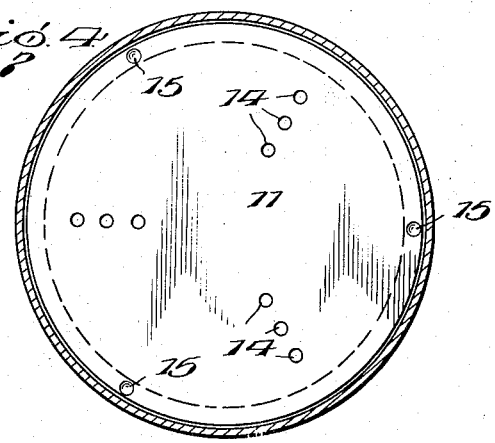
INVENTOR
P. E. Lirio,
BY
Church & Church
his ATTORNEYS Patented Apr. 9, 1935

1,997,492

UNITED STATES PATENT OFFICE 1,997,492

INSECTICIDE DISPENSING APPLIANCE

Philip E. Lirio, Vineland, N. J.

Application April 14, 1934, Serial No. 720,621

3 Claims. (Cl. 119—86)

This invention relates to an improved appliance for dusting animals with insecticidal preparations.

One object of the invention is to provide an appliance with which the insecticide can be easily dusted on the animal and the penetration of the insecticide into the hair or fur of the animal's coat greatly facilitated.

Another object is to provide an appliance of this nature which may be used as the shipping container for the insecticide.

A still further object is to provide a dusting appliance that can be produced at such a low cost that it can be discarded after the contents of its reservoir have become exhausted.

More specifically, the present appliance is preferably formed of a heavy paper, cylindrical container provided at one end with a closure plate positioned on said end by protuberances on the plate being forced into the side wall of the container by pressure exerted on the plate by a screw cap threaded on the container and enclosing said plate. The plate has a plurality of perforations therein and a number of apertures are formed in said cap, so, by rotating the cap, the plate being held stationary by said protuberances, the perforations and apertures can be brought into registry to permit the contents of the container to be expelled. The exterior of said cap is also formed with a plurality of projections or blunt barb-like members which will separate the hair of the animal being dusted and insure the insecticidal preparation penetrating the animal's coat.

With these and other objects in view, the invention consists in certain details of construction and combinations and arrangements of parts, all as will hereinafter be more fully described, and the novel features thereof particularly pointed out in the appended claims.

In the accompanying drawing,—

Figure 1 is a perspective view of the present appliance;

Fig. 2 is a top plan view;

Fig. 3 is a sectional view, longitudinally of the container or reservoir on the line 3—3 of Fig. 2; and Fig. 4 is a sectional view on the line 4—4 of Fig. 3.

The body 10 of the container is formed of heavy paper material although other compositions may be used. Paper compositions are, however, preferred, and where the closure plate 11 is to be fixed on the body by the means hereinafter described, one end of the container at least must be formed with a compressible seat for said plate.

The bottom 12 of the container may be formed of a metal disk whose periphery is spun over as shown at 13 for securing said bottom in place.

Closure plate 11 has a plurality of perforations 14 therein, preferably arranged in rows radially of the plate, and, adjacent its edge, said plate is formed with a plurality of protuberances 15 adapted to be embedded in the paper or other compressible seat at the upper end of body 10.

Threaded on the exterior of body 10 is a cap 16 which overlies plate 11 so that, by screwing the cap down on the body, protuberances 15 will be forced into the paper or other compressible seat. Cap 16 is also formed with apertures 17 which, when the appliance is not being used, are positioned out of alinement with perforations 14, so as to prevent loss of the insecticide. However, by turning the cap the apertures and perforations may be brought into registry, it being understood that the plate 11 is held stationary by the embedded protuberances.

In order to insure the insecticidal preparation, when sifted or dusted through the alined openings, penetrating the fur of the animal being treated, cap 16 is also formed with a plurality of projections 18. Where the cap is formed of metal, the projections 18 may be formed by the material which is struck up when forming apertures 17. In such a case, the points of the struck up portions should be blunted, as by bending over their ends at 19. This prevents injuring the animal's skin.

The present appliance can be produced at a sufficiently low cost to permit its being used as the shipping container for the insecticidal preparation, especially where the paper body is used. It will also be understood that, in stroking the fur or coat of an animal with the projections on the end of the appliance (the perforations 14 being uncovered), the motion of the appliance will be such as to effect a dusting of the insecticidal material and, at the same time, the projections will disturb or separate the hair or fur to insure the material penetrating the animal's coat.

What is claimed is:

1. In an insecticide dusting appliance, a reservoir having a plurality of perforations therein through which the insecticide is expelled, a movable closure plate for said perforations, portions of said plate being struck up therefrom to form apertures therein movable into and out of registry with said perforations, and a plurality of projections formed by said portions of said closure plate whereby the hair of an animal being dusted may be separated to facilitate application of the insecticide.

2. In an insecticide dusting appliance, a container open at one end, a plate covering said open end, said plate being provided with a plurality of dusting perforations through which the insecticide may be expelled, a cap threaded on said container over said end plate, said cap having portions struck up therefrom to form apertures therein through which said perforations may be exposed, and a plurality of prongs formed on said cap by said struck up portions whereby the hair of the animal being dusted may be parted to facilitate application of the insecticide.

3. In an insecticide dusting appliance, a reservoir having an open end, the side wall of said reservoir adjacent said open end being formed at least in part of a compressible material, a plate closing said open end, said plate having a plurality of dusting perforations therein and a series of protuberances thereon, a screw cap threaded on said reservoir enclosing said plate, the protuberances on the plate being forced into the compressible portion of said reservoir wall, said cap having a plurality of apertures therein adapted to register with the perforations in said plate, and means on said cap for parting the hair of the animal being dusted to facilitate application of the insecticide.

PHILIP E. LIRIO.